(12) United States Patent
Sakurai et al.

(10) Patent No.: US 7,746,587 B2
(45) Date of Patent: Jun. 29, 2010

(54) MAGNETIC RECORDING APPARATUS AND MAGNETIC RECORDING AND REPRODUCING APPARATUS

(75) Inventors: Masatoshi Sakurai, Tokyo (JP); Takeshi Saito, Tokyo (JP); Kazuto Kashiwagi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 704 days.

(21) Appl. No.: 11/527,708

(22) Filed: Sep. 27, 2006

(65) Prior Publication Data

US 2007/0206307 A1    Sep. 6, 2007

(30) Foreign Application Priority Data

Mar. 6, 2006    (JP) .............................. 2006-059607

(51) Int. Cl.
G11B 5/09    (2006.01)

(52) U.S. Cl. .............................. 360/48; 360/31; 360/39; 369/47.52; 369/275.4

(58) Field of Classification Search ........................ None
See application file for complete search history.

(56) References Cited

U.S. PATENT DOCUMENTS

| | | | |
|---|---|---|---|
| 3,286,251 A | | 11/1966 | Rendlet et al. |
| 5,218,599 A | * | 6/1993 | Tsuyoshi et al. ............ 386/103 |
| 5,274,510 A | | 12/1993 | Sugita et al. |
| 5,363,251 A | | 11/1994 | Kamo et al. |
| 5,466,904 A | | 11/1995 | Pfeiffer et al. |
| 5,477,526 A | * | 12/1995 | Inoue ...................... 369/275.4 |
| 5,545,902 A | | 8/1996 | Pfeiffer et al. |
| 5,587,850 A | | 12/1996 | Ton-that |
| 5,600,506 A | | 2/1997 | Baum et al. |
| 5,715,232 A | * | 2/1998 | Chikazawa et al. ...... 369/275.2 |
| 5,748,421 A | * | 5/1998 | Taki et al. .................. 360/135 |
| 5,812,519 A | * | 9/1998 | Kawamura et al. ....... 369/275.1 |
| 5,815,333 A | * | 9/1998 | Yamamoto et al. ............ 360/60 |
| 5,828,536 A | * | 10/1998 | Morita ....................... 360/135 |
| 5,875,083 A | | 2/1999 | Oniki et al. |
| 5,966,259 A | | 10/1999 | Mitsuishi et al. |
| 6,029,259 A | | 2/2000 | Sollish et al. |
| 6,031,808 A | * | 2/2000 | Ueno ........................... 369/111 |

(Continued)

FOREIGN PATENT DOCUMENTS

JP    60-145501    8/1985

(Continued)

OTHER PUBLICATIONS

U.S. Appl. No. 11/375,584, filed Mar. 15, 2006.

(Continued)

*Primary Examiner*—Dismery E Mercedes
(74) *Attorney, Agent, or Firm*—Nixon & Vanderhye, PC

(57) ABSTRACT

In a magnetic recording apparatus, a magnetic recording medium has a RAM area on which rewritable information can be recorded. The magnetic recording medium also has a ROM area having a pattern area in which first-type segment sequence of magnetically rewritable magnetic segments and magnetically non-rewritable nonmagnetic segments is fixedly recorded as first-type modulation information. Predetermined segments in the first-type segment sequence are magnetized and changed to magnetized segments. A segment sequence of first and second segments magnetized in one and opposite directions is used to magnetically record second-type modulation information in the pattern area.

20 Claims, 9 Drawing Sheets

U.S. PATENT DOCUMENTS

| | | | |
|---|---|---|---|
| 6,103,407 A * | 8/2000 | Izumi et al. | 428/820.2 |
| 6,263,151 B1 | 7/2001 | Nishijima et al. | |
| 6,313,969 B1 * | 11/2001 | Hattori et al. | 360/135 |
| 6,377,413 B1 | 4/2002 | Sacks et al. | |
| 6,424,479 B1 | 7/2002 | Hayashi | |
| 6,433,944 B1 * | 8/2002 | Nagao et al. | 360/16 |
| 6,433,950 B1 | 8/2002 | Liikanen | |
| 6,480,462 B2 * | 11/2002 | Ha et al. | 369/275.4 |
| 6,529,341 B1 | 3/2003 | Ishida et al. | |
| 6,563,673 B2 | 5/2003 | Mundt et al. | |
| 6,667,849 B2 | 12/2003 | Sasaki et al. | |
| 6,697,311 B1 * | 2/2004 | Kim | 369/59.1 |
| 6,748,865 B2 | 6/2004 | Sakurai et al. | |
| 6,805,966 B1 | 10/2004 | Formato et al. | |
| 6,853,320 B2 * | 2/2005 | Hayami et al. | 341/143 |
| 6,877,343 B2 | 4/2005 | Watanabe et al. | |
| 6,887,626 B2 | 5/2005 | Koba | |
| 6,961,203 B1 | 11/2005 | Baker | |
| 6,967,798 B2 | 11/2005 | Homola et al. | |
| 6,980,387 B2 | 12/2005 | Yoshizawa et al. | |
| 7,031,086 B2 | 4/2006 | Nishida et al. | |
| 7,035,036 B2 | 4/2006 | Shimomura et al. | |
| 7,038,872 B2 | 5/2006 | Yip et al. | |
| 7,141,317 B2 | 11/2006 | Kikitso et al. | |
| 7,147,790 B2 | 12/2006 | Wachenschwanz et al. | |
| 7,150,844 B2 | 12/2006 | Deeman et al. | |
| 7,203,969 B2 * | 4/2007 | Sakurai et al. | 726/34 |
| 7,214,624 B2 | 5/2007 | Fujita et al. | |
| 7,306,743 B2 | 12/2007 | Hieda et al. | |
| 7,319,568 B2 | 1/2008 | Okino et al. | |
| 7,362,528 B2 | 4/2008 | Moriya et al. | |
| 7,522,499 B2 * | 4/2009 | Hosokawa et al. | 369/47.52 |
| 2001/0018743 A1 | 8/2001 | Morishita | |
| 2002/0025039 A1 * | 2/2002 | Kato et al. | 380/44 |
| 2002/0098423 A1 | 7/2002 | Koba | |
| 2002/0100052 A1 | 7/2002 | Daniels | |
| 2002/0168548 A1 | 11/2002 | Sakurai et al. | |
| 2002/0191317 A1 | 12/2002 | Yasunaga | |
| 2003/0002671 A1 | 1/2003 | Inchalik et al. | |
| 2003/0063403 A1 | 4/2003 | Nishikawa et al. | |
| 2004/0076110 A1 * | 4/2004 | Hino et al. | 369/275.3 |
| 2004/0100711 A1 | 5/2004 | Sato et al. | |
| 2004/0101713 A1 | 5/2004 | Wachenschwanz et al. | |
| 2004/0107355 A1 | 6/2004 | Sakurai et al. | |
| 2004/0131890 A1 | 7/2004 | Kikitso et al. | |
| 2005/0079283 A1 | 4/2005 | Sakurai et al. | |
| 2005/0117253 A1 | 6/2005 | Moriya et al. | |
| 2005/0128887 A1 * | 6/2005 | Hosokawa | 369/13.35 |
| 2005/0175905 A1 | 8/2005 | Amemiya | |
| 2005/0219730 A1 | 10/2005 | Sakurai et al. | |
| 2005/0225890 A1 | 10/2005 | Sakurai et al. | |
| 2006/0012905 A1 | 1/2006 | Okino et al. | |
| 2006/0076509 A1 | 4/2006 | Okino et al. | |
| 2006/0172155 A1 | 8/2006 | Okino et al. | |
| 2006/0222967 A1 | 10/2006 | Okino et al. | |
| 2006/0263642 A1 | 11/2006 | Hieda et al. | |
| 2006/0280974 A1 | 12/2006 | Okino et al. | |

FOREIGN PATENT DOCUMENTS

| | | |
|---|---|---|
| JP | 62-256225 | 11/1987 |
| JP | 3-116506 | 5/1991 |
| JP | 04-291256 | 10/1992 |
| JP | 07-201726 | 8/1995 |
| JP | 09-73680 | 3/1997 |
| JP | 09-097482 | 4/1997 |
| JP | 09-204747 | 8/1997 |
| JP | 10-255407 | 9/1998 |
| JP | 11-96673 | 4/1999 |
| JP | 2000-020945 | 1/2000 |
| JP | 2000-339670 | 12/2000 |
| JP | 2001-143257 | 5/2001 |
| JP | 2001-312819 | 11/2001 |
| JP | 2002-008965 | 1/2002 |
| JP | 2002-15420 | 1/2002 |
| JP | 2002-50565 | 2/2002 |
| JP | 2002-197725 | 7/2002 |
| JP | 2002-222750 | 8/2002 |
| JP | 2002-280290 | 9/2002 |
| JP | 2002-334414 | 11/2002 |
| JP | 2002-342986 | 11/2002 |
| JP | 2002-343710 | 11/2002 |
| JP | 2003-141715 | 5/2003 |
| JP | 2003-142371 | 5/2003 |
| JP | 2003-151209 | 5/2003 |
| JP | 2003-157507 | 5/2003 |
| JP | 2003-157520 | 5/2003 |
| JP | 2003-263850 | 9/2003 |
| JP | 2003-281841 | 10/2003 |
| JP | 2004-39006 | 2/2004 |
| JP | 2004-110896 | 4/2004 |
| JP | 2004-158579 | 6/2004 |
| JP | 2004-179411 | 6/2004 |
| JP | 2004-265486 | 9/2004 |
| JP | 2004-311839 | 11/2004 |
| JP | 2005-166141 | 6/2005 |
| JP | 2005-293730 | 10/2005 |
| JP | 2006-031851 | 2/2006 |

OTHER PUBLICATIONS

Berger et al., *New approach to projection-electron lithography with demonstrated 0.1 μm linewidth*, Appl. Phys. Lett. 57 (2), Jul. 9, 1990, pp. 153-155.

Office Action dated Sep. 8, 2009 in JP 2006-059607 and English-language translation thereof.

\* cited by examiner

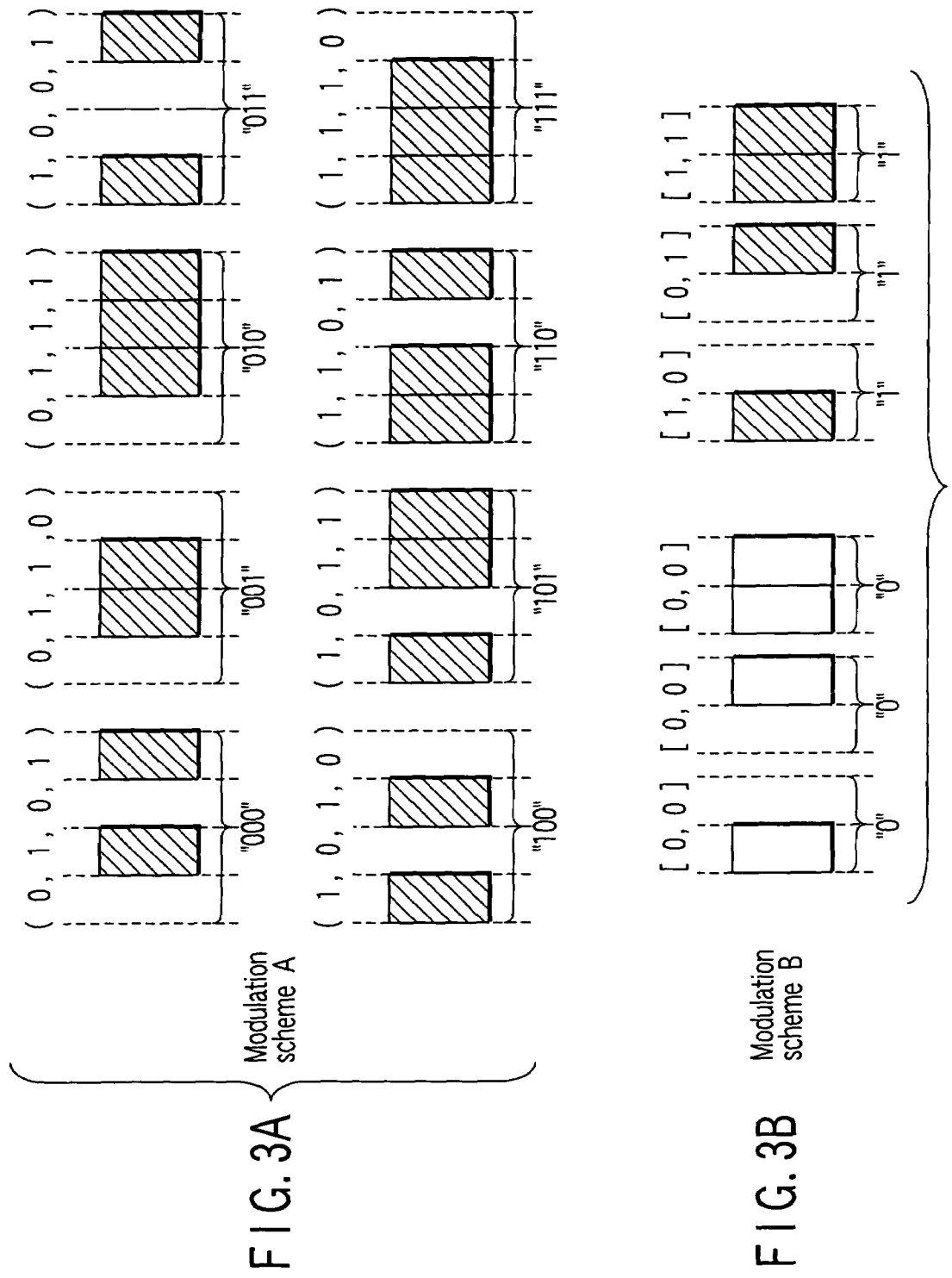
F I G. 3A Modulation scheme A
F I G. 3B Modulation scheme B

MAGNETIC RECORDING APPARATUS AND MAGNETIC RECORDING AND REPRODUCING APPARATUS

CROSS-REFERENCE TO RELATED APPLICATIONS

This application is based upon and claims the benefit of priority from prior Japanese Patent Application No. 2006-059607, filed Mar. 6, 2006, the entire contents of which are incorporated herein by reference.

BACKGROUND OF THE INVENTION

1. Field of the Invention

The present invention relates to a magnetic recording apparatus and a magnetic recording and reproducing apparatus, and in particular, a magnetic recording apparatus and a magnetic recording and reproducing apparatus in which information is recorded on the basis of arrangement of a magnetic material and in which a pattern area in which the magnetic material arrangement cannot be changed even by a read and write head is recorded on a magnetic recording medium, the magnetic recording apparatus and magnetic recording and reproducing apparatus being able to execute magnetic additional recording on the magnetic material in the non-rewritable area.

2. Description of the Related Art

Owing to the need to meet requirements for an increase in the storage capacity of magnetic recording apparatuses (also hereinafter referred to as magnetic disk apparatuses or hard disk apparatuses), demands have been made for an increase in the recording density of magnetic recording medium. However, an increase in recording density has disadvantageously caused magnetic information recorded by a read and write head moving relatively on a recording medium to affect recording in an adjacent track. This problem can be avoided by physically separating the parts of the magnetic material in adjacent tracks from one another.

For example, JPA 10-255407 (KOKAI) proposes a magnetic recording medium in which servo or ROM information is non-rewritably recorded on the basis of the presence of a magnetic material by patterning the magnetic material on the magnetic recording medium.

For example, JPA 10-255407 (KOKAI) discloses a scheme of enabling servo or ROM information to be recorded on the basis of the presence of a magnetic material by patterning the magnetic material on the magnetic recording medium.

In a recording portion, ROM information is recorded by patterning a magnetic material. In general, if information is newly recorded in an area in which the ROM information has been recorded, magnetic segments and nonmagnetic segments are inconsecutively arranged in the area; magnetic information can be recorded in the magnetic segments but not in the nonmagnetic segments. Consequently, when a write head provided in a recording and reproducing apparatus is used to overwrite the recording portion in which ROM information has already been written, information is not recorded in the nonmagnetic segments present in the recording portion. Thus, the overwritten information cannot be reproduced. As a result, with a magnetic recording medium with ROM information, an additionally recordable capacity is equal to the recording capacity of the entire medium minus the amount corresponding to the recording portion in which the ROM information has been recorded. This reduces the recording capacity of the entire recording medium. However, demands have been made to provide a sufficient additionally recordable capacity for a magnetic recording medium with a ROM information recording portion to minimize a decrease in additionally recordable capacity.

BRIEF SUMMARY OF THE INVENTION

According to an aspect of the present invention provides a magnetic recording apparatus comprising:

a magnetic recording medium including a ROM area, and a RAM area on which rewritable information is magnetically recorded, the ROM area having a pattern of a first-type segment sequence indicating first-type modulation information which is fixedly recorded on the ROM area, the first-type segment sequence being formed as a sequence of magnetic and nonmagnetic segments, and a recording unit configured to record second-type modulation information on the ROM area, the recording unit selectively magnetizing the magnetic segments in the pattern to record a second-type segment sequence of first and second segments magnetized in one and opposite directions, which indicates the second-type modulation information.

According to another aspect of the present invention provides a magnetic recording medium comprising:

a RAM area on which rewritable information is magnetically recorded; and a ROM area having a pattern of a first-type segment sequence indicating first-type modulation information which is fixedly recorded on the ROM area, the first-type segment sequence being formed as a sequence of magnetic and nonmagnetic segments, the magnetic segments in the pattern being selectively magnetized to record a second-type segment sequence of first and second segments magnetized in one and opposite directions on the ROM area, which indicates the second-type modulation information.

According to yet another aspect of the present invention provides a method of magnetically recording first-type and second-type modulation information and rewritable information on a magnetic recording medium, the magnetic recording medium including a ROM area and a RAM area on which the rewritable information is magnetically recorded, the ROM area having a pattern of a first-type segment sequence indicating the first-type modulation information which is fixedly recorded on the ROM area, the first-type segment sequence being formed as a sequence of magnetic and nonmagnetic segments, the method comprising:

recording the second-type modulation information on the ROM area, which includes selectively magnetizing the magnetic segments in the pattern to record a second-type segment sequence of first and second segments magnetized in one and opposite directions, which indicates the second-type modulation information.

BRIEF DESCRIPTION OF THE SEVERAL VIEWS OF THE DRAWING

FIGS. 3A and 3B are plan views schematically showing how data is recorded on recording medium by first- and second-type modulation schemes A and B which are different from each other, utilizing a magnetic recording scheme according to a second embodiment;

DETAILED DESCRIPTION OF THE INVENTION

Figure 1A:
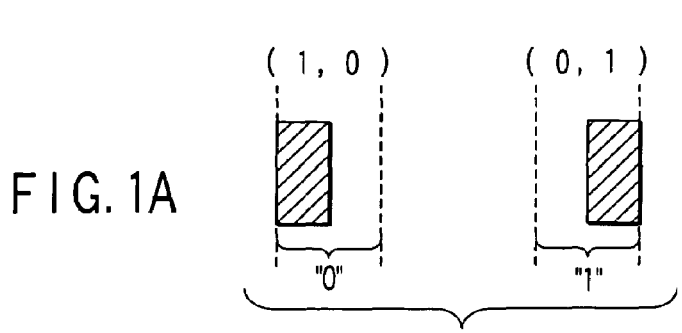
FIGS. 1A and 1B are plan views schematically showing how data is recorded on a recording medium by first- and second-type modulation schemes A and B which are different from each other and which are utilized for a magnetic recording scheme according to an embodiment.

Referring to the drawings as required, description will be given of a magnetic recording apparatus and an additional recording method according to embodiments of the present invention.

Embodiment 1

Figure 1B:
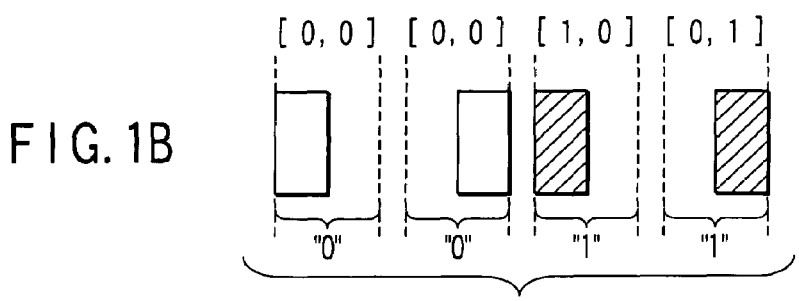

With reference to FIGS. 1A and 1B and 2A to 2C, description will be given of an additional recording method according to an embodiment of the present invention. FIGS. 1A and 1B show how data is recorded on a recording medium by first- and second-type modulation schemes A and B which are different from each other and which are utilized for a magnetic recording scheme according to an embodiment.

A recording medium comprises recording areas including a non-erasable ROM area and a repeatedly erasable and writable RAM area. As described below in detail, non-erasable ROM data is recorded in the non-erasable area by a first-type modulation scheme A. Further, the magnetic segments in the non-erasable ROM area can be utilized to record erasable data by means of a second-type modulation scheme.

As shown in FIG. 1A, the first-type modulation scheme A modulates an original first-type data bit, that is, a bit "0" based on the first-type modulation scheme is modulated to first-type recording bits (1, 0), which are recorded as a pattern (1, 0) of a magnetic and nonmagnetic segments. An original first-type data bit "1" is modulated to first-type recording bits (0, 1), which are recorded as a pattern (0, 1) of the nonmagnetic and magnetic segments. In FIG. 1A, a hatched pattern (rectangle area with hatched lines) shows a recording bit (1) of the magnetic segment, and a blank shows a recording bit (0) of the nonmagnetic segment. The first-type modulation scheme A magnetizes the magnetic segments in the segment sequence of the original data bit "0" or "1", in the same direction (direction 1) within the same pattern area. The magnetic segments surely include the recording bits (1) and (0). For example, in FIG. 1, it is assumed that the recording bit (0), shown as a blank, is recorded as nonmagnetic segments that cannot be magnetically detected by a magnetic head and the recording bit (1), shown as a hatched pattern, is recorded as a magnetic segment that can be magnetically detected by the magnetic head. Then, regardless of whether the original data bit is "0" or "1", the magnetic segment (1) corresponding to one recording bit is surely provided in the pattern area. Even when the nonmagnetic segment is represented by the recording bit (1) and the magnetic segment is represented by the recording bit (0), the magnetic segment (1) is similarly provided in a segment sequence (area of one data bit which corresponds to two segments) corresponding to one data bit.

Here, the pattern area means an area which is composed of an inerasable segment sequence (physically non-rewritable sequence) and the magnetization in the direction 1, of which can be detected by the magnetic head as will be described later. A predetermined pattern (recording bit pattern) may be formed by arranging magnetic segments in which an internal magnetic layer can be detected and inverse-magnetized segments in which a magnetic layer is formed but inversed magnetization (direction 2) cannot be detected as the magnetized (direction 1) segments. Alternatively, a predetermined pattern (data pattern) may be formed by arranging magnetic segments with a magnetic layer and nonmagnetic segments free from a magnetic layer. Hereafter, the segment 1 and segment 0 are identified depending on whether or not a detection head can detect the magnetization in the direction 1 of that segment, regardless of the presence of a magnetic layer.

As shown in FIG. 1B, the second-type modulation scheme B modulates the original second-type data bit "0" to second-type recording bits [0, 0], which are recorded as a sequence of segment 0 [0, 0]. The original data bit "1" is modulated to second-type recording bits [1, 0] or [0, 1], which are recorded as a sequence of a segment 1 and a segment 0 [1, 0] or [0, 1]. Here, the segment sequence corresponding to the original first-type data bit "0" or "1" surely contains the magnetic segment, which can be magnetized in the direction 1 or the direction 2 to rewrite the segment sequence to the second-type recording bits corresponding to the original second-type data bit. A magnetic segment magnetized in the direction 1 is called a segment 1, and a magnetic segment magnetized in direction 2 is called a segment 0.

In demodulation based on the second-type modulation scheme B, "0" means that "2 recording bits contain consecutive 0s". "1" means that "2 recording bits surely contain 1". In other words, if magnetized in direction 1 is not physically detected in 2 segments representing 1 original second-type data bit, the original data bit is "0". If magnetized in direction 1 is physically detected in 2 segments representing 1 original second-type data bit, the original data bit is "1". The opposite definition is also possible. That is, if magnetized in direction 1 is not physically detected in 2 segments representing 1 original data bit, the original data bit is "1". If magnetized in direction 1 is physically detected in 2 segments representing 1 original data bit, the original data bit is "0".

Specifically, if the original first-type data bit "0", which cannot be erased by the first-type modulation scheme as shown in FIG. 1A, is the sequence (1, 0) of the segment 1 and segment 0, the original second-type data bit "0", which can be rewritten by the second-type modulation scheme, is modulated and recorded as two inverse-magnetized segments in the direction 2 as shown in FIG. 1B. In contrast, as shown in FIG. 1B, the original second-type data bit "1", which can be rewritten by the second-type modulation scheme, is modulated to the first-type bits and recorded as the sequence [1, 0] of the segment 1 and segment 0. Similarly, if the original data bit "0", which cannot be erased by the first-type modulation scheme as shown in FIG. 1A, is the sequence (0, 1) of the nonmagnetic and magnetic segments, the second-type modulation scheme modulates the rewritable original second-type data bit "0" to the second-type bits and records these bits as two segment 0 [0, 0]. In contrast, as shown in FIG. 1B, the original data bit "1", which can be rewritten by the second-type modulation scheme, is modulated to the second-type bits and recognized as the sequence [0, 1] of the segment 0 and segment 1.

As described above, a large number of segments constitute a pattern area in which data bits are recorded by the first- and second-type modulation schemes, that is, recording schemes. The minimum recording unit for 1 data bit is defined to be 2 segments consisting of the magnetic segment, in which magnetic recording in the direction 1 can be executed, and the nonmagnetic segment, in which magnetic recording cannot be executed. The first-type modulation scheme A non-erasably records first-type modulation data (information) in a combinatory sequence of the magnetic and nonmagnetic segment in 2 segments. The second-type modulation scheme rewritably records second-type modulation data (information) by magnetizing (magnetically recording in the direction 1) or inverse-magnetizing (magnetically recording in the direction 2) the magnetic segments in 2 segments.

In normal magnetic recording, magnetization corresponds to magnetic recording, whereas non-magnetization corresponds to erasure. However, clearly, in vertical magnetic recording, magnetic recording may correspond to magnetization of an N pole, whereas magnetic erasure corresponds to magnetization of an S pole, or vice versa. Accordingly, magnetization in the direction 1 includes recording in or magnetization of a particular pole toward the direction 1. Magnetization in the direction 2 includes recording in or magnetization of a particular pole toward the direction 2, which means magnetization of the opposite pole. The nonmagnetic segment is not magnetized and is thus not recognized as the magnetization in the direction 1.

It should be noted that in FIGS. 1A and 1B, the segment corresponds to the area enclosed by broken lines and that the segments are shown separately for the convenience of description. It should be noted that actual recording consecutively forms segments.

Read-only ROM data (original first-type data) recorded during production of a recording medium, that is, a magnetic disk is recorded on the recording medium (magnetic disk) by the first-type modulation scheme A. Erasable additional-recording data (original second-type data) is additionally recorded on the recording medium (magnetic disk) by the modulation scheme B. In a pattern area in which the read-only original first-type data has been recorded by the modulation scheme A, the original second-type data can be recorded by the modulation scheme B so that it can be distinguished from the original first-type data. The additional-recording data (original second-type data) can be read by the modulation scheme B separately from the read-only ROM data.

Figure 2A:
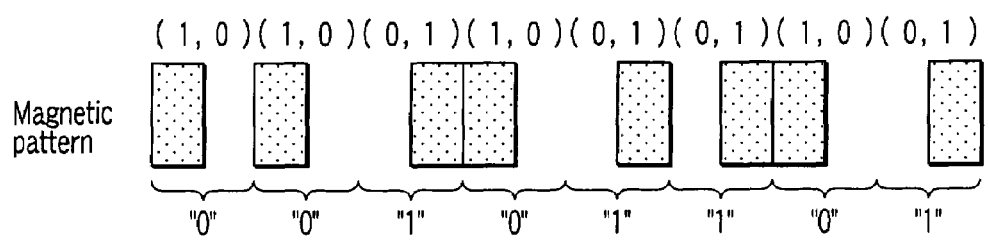
FIGS. 2A, 2B, and 2C are plan views schematically showing that recording segments on which recording has been executed by the first-type modulation scheme A shown in FIG. 1A are demagnetized and additional recording is then executed on the recording segments by the second-type modulation scheme B shown in FIG. 1B.
Figure 2B:
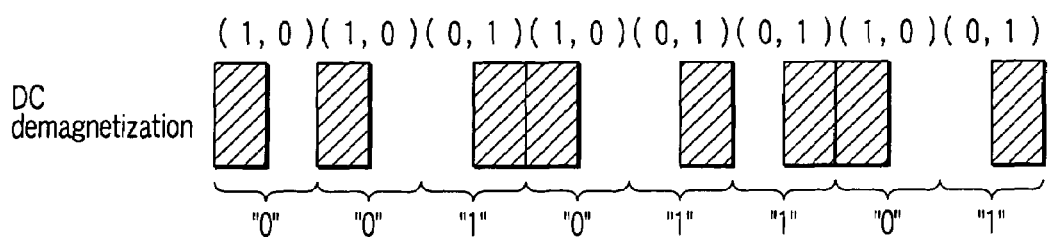
Figure 2C:
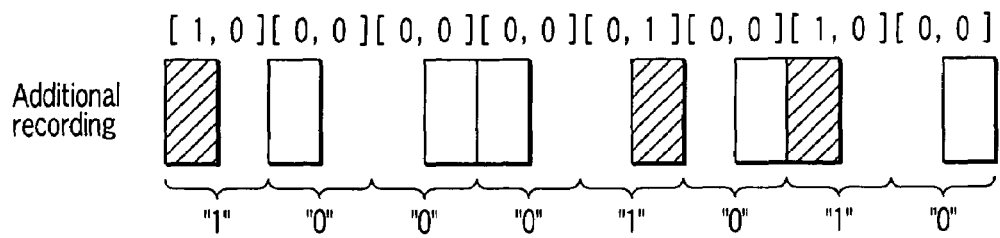

FIGS. 2A to 2C shows that additional recording can be executed on the recording area on which recording has already been executed by the modulation scheme A.

As shown in FIG. 2A, during production of recording medium (magnetic disk), information IA "00101101" is recorded on the recording medium by the first-type modulation scheme A shown in FIG. 1A. During production of the recording medium, the information IA "00101101" is composed of a pattern of the magnetic segment and the nonmagnetic magnetized segment. Specifically, the information IA "00101101" is consecutive recording of 2-segment sequences (10) and (10) of the magnetic and nonmagnetic segments corresponding to "00", a 1-segment sequence (0,1) of the nonmagnetic and magnetic segments corresponding to "1", a 1-segment sequence (10) of the magnetic and nonmagnetic segments corresponding to "0", 2-segment sequences (0, 1) and (0, 1) of the nonmagnetic and magnetic segments corresponding to "11", a 1-segment sequence (1, 0) of the magnetic and nonmagnetic segments corresponding to "0", and a 1-segment sequence (0, 1) of the nonmagnetic and magnetic segments corresponding to "1".

Then, in the magnetic disk in which non-erasable ROM data has been recorded, as shown in FIG. 2B, a write head or a demagnetizing device erases all the magnetic magnetized segments from or writes a recording state into a RAM recording portion in the pattern area with. FIG. 2B shows that the write head or demagnetizing device records the second-type recording bit "1" in all the magnetic segments in the pattern area. Even when the second-type recording bit "1" is thus written into the magnetic segments, the information IA recorded in the pattern area can be acquired by using a read head to demodulate the first-type recording bits by means of the modulation scheme A. This initialize process executes only magnetic recording or erasure and does not change the sequence of the nonmagnetic and magnetic segments as shown in FIG. 2B; even the write head or demagnetizing device cannot change the sequence. Consequently, the information (data) recorded in the pattern area can be acquired by using the read head to demodulate it by means of modulation scheme A.

As shown in FIG. 2C, the write head is used to record information IA, for example, information "10001010" in the pattern area by means of the modulation scheme B. The first- and second-type 2-segment sequences (10) and (10) each consisting of the magnetic and nonmagnetic segments are recorded as the segment 1 and segment 0 [0, 1] corresponding to "10" and the segment 0 [0, 0]. Next, the third 1-segment sequence (0, 1) consisting of the nonmagnetic and magnetic segments and the fourth 1-segment sequence (10) of the magnetic and nonmagnetic segments are recorded as the segment 0 [0, 0] corresponding to "00". The fifth and sixth 2-segment sequences (0, 1) and (0, 1) each consisting of the nonmagnetic and magnetic segments are recorded as the segment 0 and segment 1 [0, 1] corresponding to "10" and the segment 0 [0,

0]. The seventh 1-segment sequence (1, 0) consisting of the magnetic and nonmagnetic segments corresponding to "0" is recorded as the segment 1 and segment 0 [1, 0] corresponding to "1". The final, eighth 1-segment sequence (0, 1) consisting of the nonmagnetic and magnetic segments is recorded as the segment 0 [0, 0] corresponding to "0".

The maximum inversion interval for the modulation scheme A is specified to be 2. The minimum inversion interval for the modulation scheme B is specified to be 2. A combination of the modulation schemes A and B enables the information IB to be recorded in the pattern area in which the information IA has been recorded as a pattern and then enables the additionally recorded information IB to be acquired using the modulation scheme B.

Embodiment 2

With reference to FIGS. 3A, 3B, and 4A to 4C, description will be given of an additional recording method according to a second embodiment of the present invention. FIGS. 3A, 3B, and 4A to 4C show how data is recorded on a recording medium in which recording has been executed by a first- and second-type modulation schemes A and B which are different from each other, utilizing a magnetic recording scheme according to a second embodiment of the present invention.

The first-type modulation scheme A shown in FIG. 3A and the modulation scheme B shown in FIG. 3B use different block lengths. As shown in FIG. 3A, the modulation scheme A uses 4 segments to represent original 3 bits; it modulates the original 3 bits to a 4-bit pattern (first-type recording bits) and records the pattern as 4 segments. With the modulation scheme A, if for example, the recording bit (0) is represented by the nonmagnetic segment and the recording bit (1) is represented by the magnetic segment, the 4 first- and second-type segments representing the original 3 bits surely contain the magnetically recordable magnetic segment corresponding to one recording bit (1). Accordingly, 2 segments can be used as a recording unit for the second-type modulation scheme B to record the second-type modulation data modulated by the second-type modulation scheme.

Specifically, as shown in FIG. 3A, original 3-bit data "000" is represented by a segment sequence (0, 1, 0, 1) of the nonmagnetic and magnetic segments. The consecutive-segment sequence (0, 1) surely contains the magnetic segment (1). Original 3-bit data "001" is represented by a segment sequence (0, 1, 1, 0) of the nonmagnetic, magnetic, magnetic, and nonmagnetic segments. The consecutive-segment sequence (0, 1) or (1, 0) surely contains the magnetic segment (1). Original 3-bit data "010" is represented by a segment sequence (0, 1, 1, 1) of the nonmagnetic, magnetic, magnetic, and magnetic segments. The consecutive-segment sequence (0, 1) or (1, 1) surely contains the magnetic segment (1). Similarly, original data "011" is represented by a segment sequence (1, 0, 0, 1), original data "100" is represented by a segment sequence (1, 0, 1, 0), and original data "101" is represented by a segment sequence (1, 0, 1, 1). Original data "110" is represented by a segment sequence (1, 1, 0, 1), and original data "111" is represented by a segment sequence (1, 1, 1, 0). In any case, the consecutive-segment sequence (0, 1) or (1, 0) surely contains the magnetic segment (1).

As shown in FIG. 3B, the modulation scheme B represents the original data "0" by the segment 0 and segment 1 [0, 0] and the original data "1" by the segment 1 and segment 0 [1, 0] or the segment 1 [1, 1]. Each of the recording portions based on the modulation scheme B is surely aligned with the segment corresponding to the former 2 recording bits for the recording positions based on the modulation scheme A or the segment corresponding to the latter 2 recording bits. In demodulation based on the modulation scheme B, "0" means that "2 recording bits contain consecutive 0s". "1" means that "2 recording bits surely contain 1".

Figure 4A:
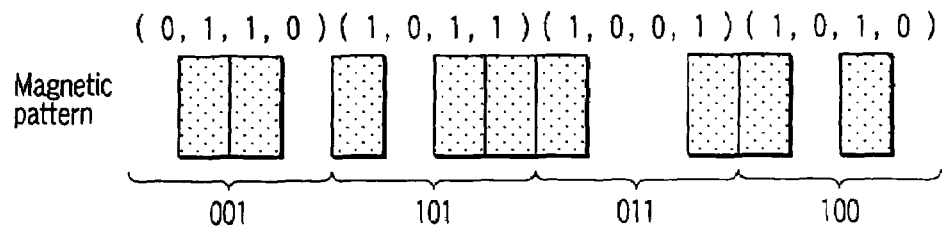
FIGS. 4A to 4C are plan views schematically showing that recording segments on which recording has been executed by the first-type modulation scheme A shown in FIG. 3A are demagnetized and additional recording is then executed on the recording segments by the second-type modulation scheme B shown in FIG. 3B.
Figure 4B:
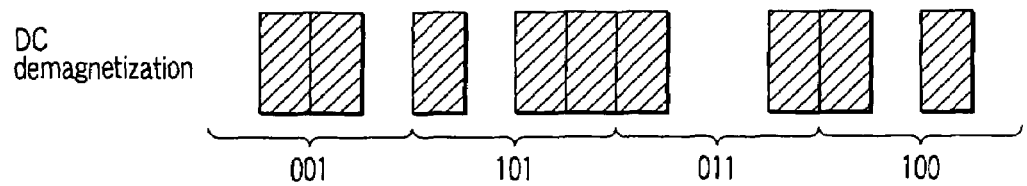

As shown in FIG. 4A, if information IA "001101011100" is recorded using the modulation scheme A shown in FIG. 3A during production of a medium, it is formed into a pattern of segment sequences (0, 1, 1, 0), (1, 0, 1, 1), (1, 0, 0, 1), and (1, 0, 1, 0) composed of a combination of the magnetic and nonmagnetic segments during production of the medium. As shown in FIG. 4B, when the write head or demagnetizing device is used to record the recording bit "1" in all the magnetic segments within the pattern area, this recording does not change the pattern of the segment sequences (0, 1, 1, 0), (1, 0, 1, 1), (1, 0, 0, 1), and (1, 0, 1, 0). The read head can then be used to demodulate the information IA recorded in the pattern area by the modulation scheme A.

Figure 4C:
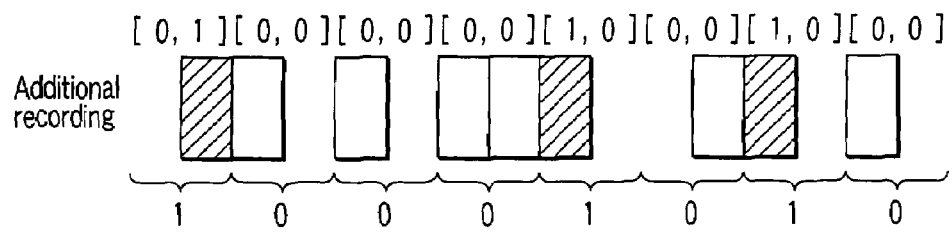

Then, as shown in FIG. 4C, if information IB "10001010" is recorded in the pattern area using the write head, it is recorded as combinations each of two segments, that is, the segment 1 and segment 0, [0, 1], [0, 0], [0, 0], [0, 0], [1, 0], [0, 0], [1, 0], [0, 0].

In the example shown in FIGS. 4A to 4C, the maximum inversion interval for the modulation scheme A is specified to be 2. The minimum inversion interval for the modulation scheme B is specified to be 2. A combination of the modulation schemes A and B enables the information IB to be recorded in the pattern area in which the information IA has been recorded as a pattern and then enables the additionally recorded information IB to be acquired using the modulation scheme B.

Embodiment 3

With reference to FIGS. 5A, 5B, and 6A to 6C, description will be given of an additional recording method according to a second embodiment of the present invention. FIGS. 5A, 5B, and 6A to 6C show how data is recorded on recording medium in which recording has been executed by a first- and second-type modulation schemes A and B which are different from each other, utilizing a magnetic recording scheme according to a second embodiment of the present invention.

Figures 5A, 5B:
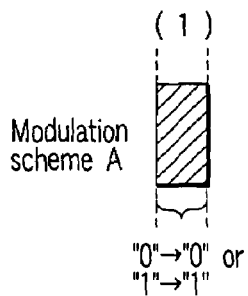
FIGS. 5A and 5B are plan views schematically showing how data is recorded on a recording medium by a first-type modulation scheme A utilizing a magnetic recording scheme according to a third embodiment.
Figure 5C:
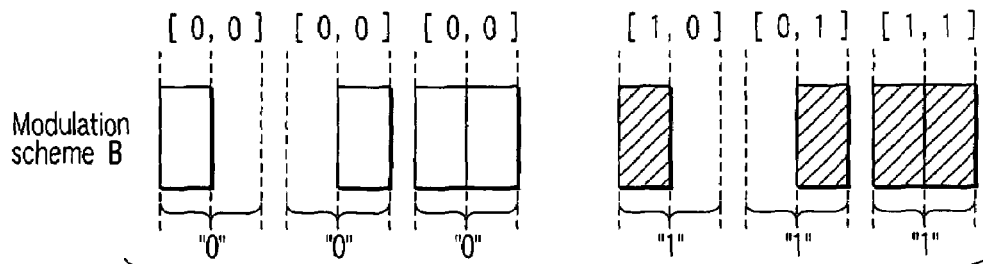
FIG. 5C is a plan view schematically showing how data is recorded on a recording medium by a second-type modulation scheme B different from the first type utilizing the magnetic recording scheme according to the third embodiment.

FIG. 5A shows an example of the modulation scheme A not having the concept of blocks on the basis of which original first-type data bits are represented by a predetermined number of segments. The modulation scheme A records a first-type recording bit corresponding to the transition state of the original first-type data bits, on a recording medium. Specifically, if the original first-type data bit string is scanned through a 2-bit detection window to find that no change has occurred between the 2 bits (the 2 bits are the same), the first-type recording bit (1) is recorded. If a change has occurred between the 2 bits, first-type recording bits (1, 0) are recorded. More specifically, as shown in FIG. 5A, the data bit preceding the original data bit string is assumed to be "0" or "1". If the data bit preceding the original data bit string is assumed to be "0" and the succeeding leading bit is "0", then no change has occurred between the 2 bits (the 2 bits are the same) and this transition is modulated to the recording bit (1), which is then recorded. If the data bit preceding the original data bit string is assumed to be "1" and the succeeding leading bit is "1" as shown in FIG. 5A, then similarly no change has occurred between the 2 bits (the 2 bits are the same) and this transition is modulated to the first-type recording bit (1), which is then recorded. If the 2 bits in the original data bit string which are to be modulated are changed from "0" to "1" as shown in FIG. 5B, then a change has occurred between the 2 bits and this transition is modulated to the first-type recording bits (1, 0), which is then recorded. For example, the modulation scheme A assigns the first-type recording bit (0) to the segment 0 and the first-type recording bit (1) to the segment 1. On the contrary, the first-type recording bit (1) may be assigned to the segment 0, while the first-type recording bit (0) may be assigned to the segment 1. With the modulation scheme A that determines the modulation output on the basis of the bit transition, the segment 0 are not consecutively arranged in two or more recording bits in the area in which a pattern has been formed.

As is the case with FIGS. 2C and 3C, the modulation scheme B, the original second-type data bit "0" is recorded as second-type recording bits [0, 0]. The original second-type data bit "1" is recorded as second-type recording bits [1, 1]. In demodulation based on the modulation scheme B, the original second-type data bit "0" means that "2 recording bits contain consecutive 0s". The original second-type data bit "1" means that "2 recording bits surely contain 1".

Figure 6A:
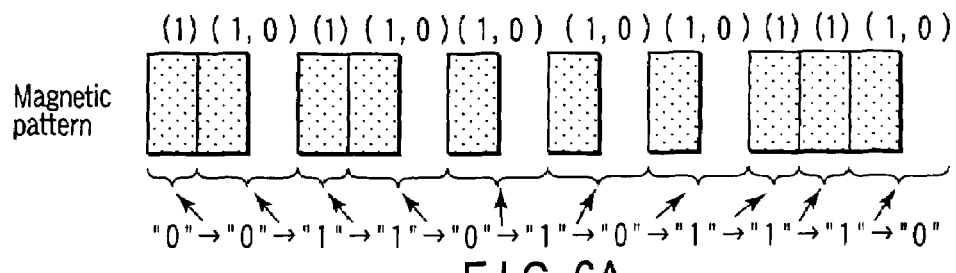
FIGS. 6A to 6C are plan views schematically showing that recording segments on which recording has been executed by the first-type modulation scheme A shown in FIG. 5A are demagnetized and additional recording is then executed on the recording segments by the second-type modulation scheme B shown in FIG. 5B.

As shown in FIG. 6A, if information IA "0110101110" is recorded using the modulation scheme A shown in FIGS. 5A and 5B during production of medium, it is modulated to the first-type recording bit, which is then recorded. During production of the medium, the first-type recording bit is recorded as a pattern of the magnetic and nonmagnetic segments.

If the information IA as the original first-type data is modulated in accordance with the modulation scheme A, a bit "0" for modulation is added to the position preceding the leading bit of the information IA "0110101110" as the original first-type data. Since the data bit "0" is added to the original first-type data (information IA) "0110101110", "0" in the consecutive data bit string is followed by "0". The first-type recording bit (1) is generated and recorded as the leading magnetic segment (1). The original leading data bit of the original first-type data (information IA) "0110101110" is 0, followed by the bit "1". Consequently, the first-type recording bits (1, 0) are generated to indicate the transition from "0" to "1". The recording bits (1, 0) are recorded as the sequence (1, 0) of the magnetic and nonmagnetic segments. Then, the bit "1" is followed by another bit "1", so that the first-type recording bits (1) is generated to indicate the transition from "1" to "1". The recording bit (1) is recorded as the magnetic segment sequence (1). A similar process is repeated to form strings of the first-type recording bits (1), (1, 0), (1), (1, 0), (1, 0), (1, 0), (1, 0), (1), (1), (1, 0) is formed in the recording medium as combinations of the magnetic and nonmagnetic segments.

Figure 6B:
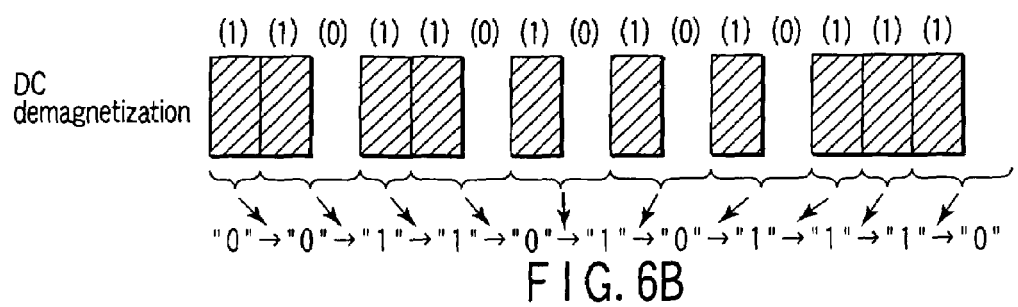

As shown in FIG. 6B, the write head or demagnetizing device is used to record (1) in all the magnetic segments in the pattern area shown in FIG. 6A. Even with this demagnetizing process, the magnetic segments only have their physical properties changed, that is, some of them are magnetized, while the others or not. The magnetic segments thus keep their magnetic property. Consequently, the read head can be used to demodulate the first-type recording bits recorded in the pattern area to the information IA "0110101110" by the modulation scheme A.

Figure 6C:
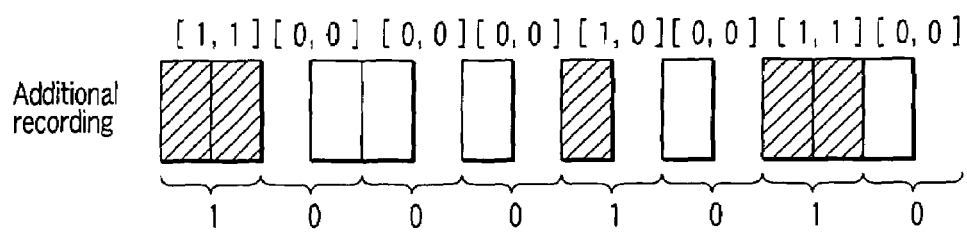

Then, as shown in FIG. 6C, the write head is used to record information IB "10001010" by means of the second-type modulation scheme B. In this recording, the maximum inversion interval for the first-type modulation scheme A is specified to be 1. The minimum inversion interval for the second-type modulation scheme B is specified to be 2 as is the case with FIGS. 2C and 4C. A combination of the first-type modulation scheme A and second-type modulation scheme B enables the information IB to be recorded in the pattern area in which the information IA has been recorded as a pattern and then enables the additionally recorded information IB to be acquired using the second-type modulation scheme B.

Embodiment 4

With reference to FIGS. 7A, 7B, 8A to 8C, and 9, description will be given of a method of enabling the information IA to be demodulated without destroying the information IB as a result of demagnetization.

Figure 7A:
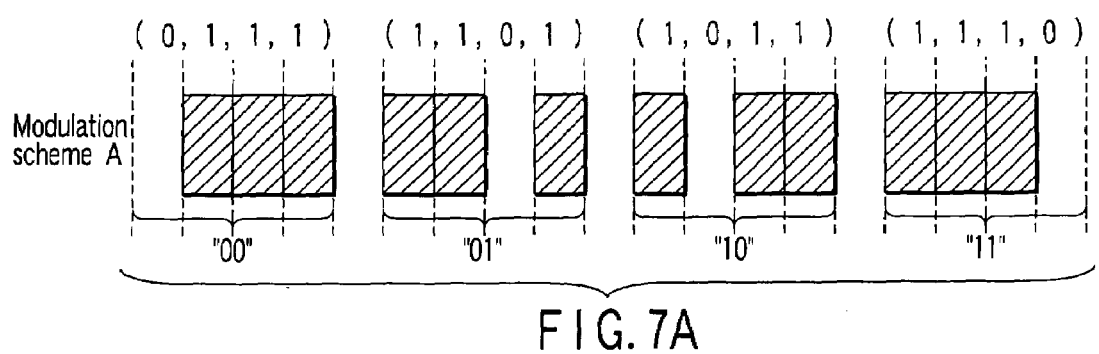
FIGS. 7A and 7B are plan views schematically showing how data is recorded on recording medium by a first- and second-type modulation schemes A and B which are different from each other, utilizing a magnetic recording scheme according to a fourth embodiment.

The first-type modulation scheme A shown in FIG. 7A modulates original first-type data of 2 bits to a pattern of 4 recording bits. With the modulation scheme A, if the first-type recording bit (0) is specified to be the non-magnetic segment and the first-type recording bit (1) is specified to be the magnetic segment, all the patterns of 4 first-type recording bits are each composed of the magnetic segment of 3 bits and the nonmagnetic segment of 1 bit. As shown in FIG. 7A, the original first-type data bits "00" are recorded as a sequence (0, 1, 1, 1) of the nonmagnetic, magnetic, magnetic, and magnetic segments representing the first-type recording bits (0, 1, 1, 1). The original first-type data bits "01" are recorded as a sequence (1, 1, 0, 1) of the magnetic, magnetic, nonmagnetic, and magnetic segments representing the first-type recording bits (1, 1, 0, 1). The original first-type data bits "10" are recorded as a sequence (1, 0, 1, 1) of the magnetic, nonmagnetic, magnetic, and magnetic segments representing the first-type recording bits (1, 0, 1, 1). The original first-type data bits "11" are recorded as a sequence (1, 1, 1, 0) of the magnetic, magnetic, magnetic, and nonmagnetic segments representing the first-type recording bits (1, 1, 1, 0).

Figure 7B:
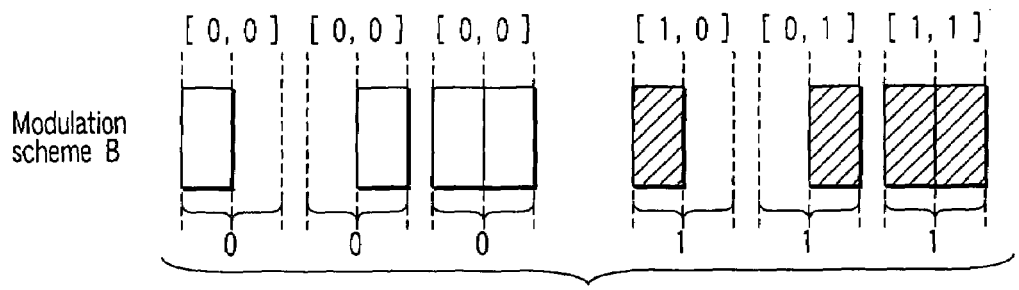

As shown in FIG. 7B, the second-type modulation scheme B converts the original second-type data bit "0" into second-type recording bits [0, 0] and records them as segment 0 [0, 0]. The second-type modulation scheme B converts the original second-type data bit "1" into second-type recording bits [1, 0], [0, 1], or [1, 1] and records them as segment 0 [1, 0], [0, 1], or [1, 1]. The 4 second-type segments based on the modulation scheme B are distributed to the former or latter 2 of the 4 first-type segments based on the modulation scheme A. In demodulation based on the modulation scheme B, the original second-type data bit "0" means that "2 recording bits contain consecutive 0s", that is, the 2 second-type segments are segment 0. The original second-type data bit "1" means that "2 recording bits contain 1", that is, one of the 2 second-type segments is segment 1, while the other is segment 0.

Figure 8A:
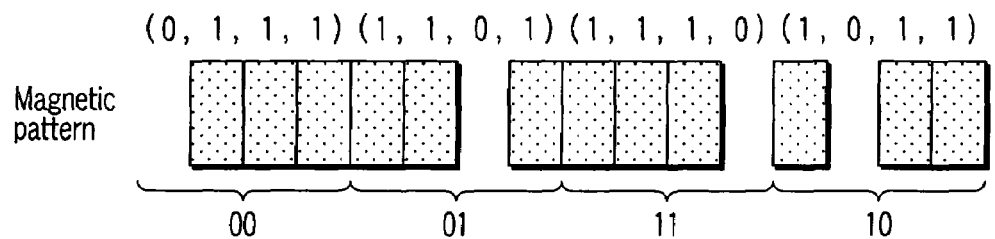
FIGS. 8A to 8C are plan views schematically showing that additional recording is executed, by the second-type modulation scheme B shown in FIG. 7B, on the recording segments on which recording has been executed by the first-type modulation scheme A shown in FIG. 7A, and the recording segments based on the second-type modulation method B shown in FIG. 7B are reproduced without demagnetization.

FIG. 8A shows an example in which information IA "00011110" is recorded by the first-type modulation scheme A shown in FIG. 7A. During production of medium, the information IA "00011110" is formed of a pattern of the magnetic and nonmagnetic segments as shown in FIG. 8A. In other words, the leading 2 bits "00" of the information IA "00011110" are formed into a pattern (0, 1, 1, 1) of the nonmagnetic, magnetic, magnetic, and magnetic segments corresponding to first recording bits (0, 1, 1, 1). The following 2 bits "01" are formed into a pattern (1, 1, 0, 1) of the magnetic, magnetic, nonmagnetic, and magnetic segments corresponding to first recording bits (1, 1, 0, 1). Similarly, the following 2 bits "11" are formed into a pattern (1, 1, 1, 0) of the magnetic, magnetic, magnetic, and nonmagnetic segments corresponding to first recording bits (1, 1, 1, 0). The final 2 bits "10" are formed into a pattern (1, 0, 1,) of the magnetic, nonmagnetic, magnetic, and magnetic segments corresponding to first recording bits (1, 0, 1, 1).

Figure 8B:
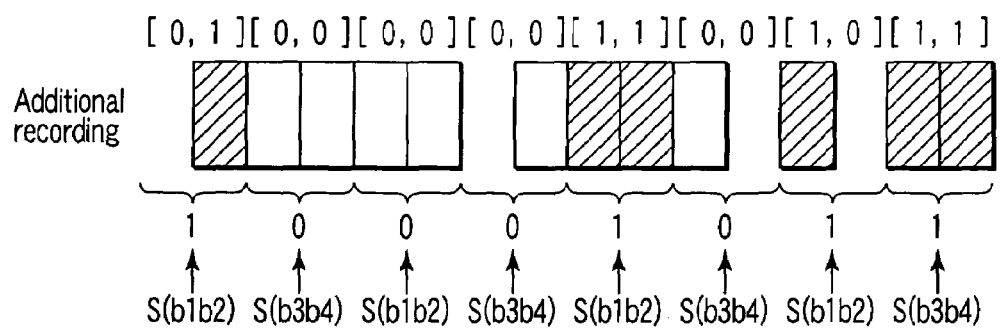

Then, as shown in FIG. 8B, the write head is used to record second information IB "10001011" in the pattern area by means of the second-type modulation scheme B. In other words, the data bits "10001011" are recorded as combinations of the segment 1 and segment 0 corresponding to strings of the second-type recording bits [0, 1] (segment 0 and segment 1), [0, 0] (segment 0 and segment 0), [0, 0] (segment 0 and segment 0), [0, 0] (segment 0 and segment 0), [1, 1) (segment 1 and segment 1), (0, 0] (segment 0 and segment 0), (1, 0) (segment 1 and segment 0), and [1, 1] (segment 1 and segment 1).

In this recording, the maximum inversion interval for the modulation scheme A is specified to be 2. The minimum inversion interval for the modulation scheme B is specified to be 2. A combination of the modulation schemes A and B enables the information IB to be recorded in the pattern area in which the information IA has been recorded as a pattern and then enables the additionally recorded information IB to be acquired using the modulation scheme B.

Figure 8C:
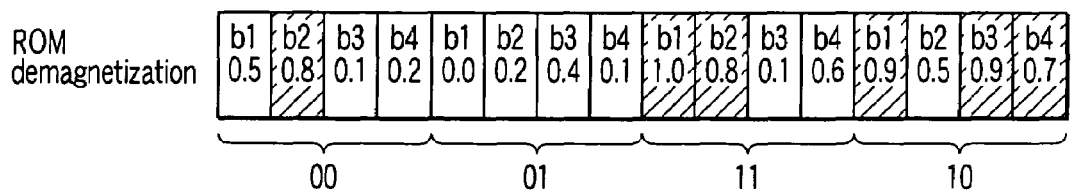

Then, as shown in FIG. 8C, the intensities b1, b2, b3, and b4 of reproduction signals for the segments in the pattern area are acquired in order to demodulate the information IA "00011110". The second-type data bits are also acquired from signals S(b1, b2) and S(b3, b4) detected in the segments in the pattern area. Subsequently, the information IA is demodulated in accordance with the flow chart shown in FIG. 9A.

The numerical values (0.5, 0.8, . . . etc.: relative values) shown in FIG. 8C indicate the intensities b1, b2, b3, and b4 of the reproduction signals. The term "reproduction signal intensity" as used in the specification refers to a numerical value which is larger for the magnetized in the direction 1 state (1) of the magnetic segments and which is smaller for the magnetized in the direction 2 state (0) of the magnetic segments; the larger value indicates a higher reproduction level, whereas the smaller value indicates a lower reproduction level. The reproduction signal intensity for the non-magnetic segments has an intermediate value between the reproduction signal intensities for the magnetized in the direction 1and in the direction 2. This is because the inside of the segment area is not magnetized.

Figure 9:
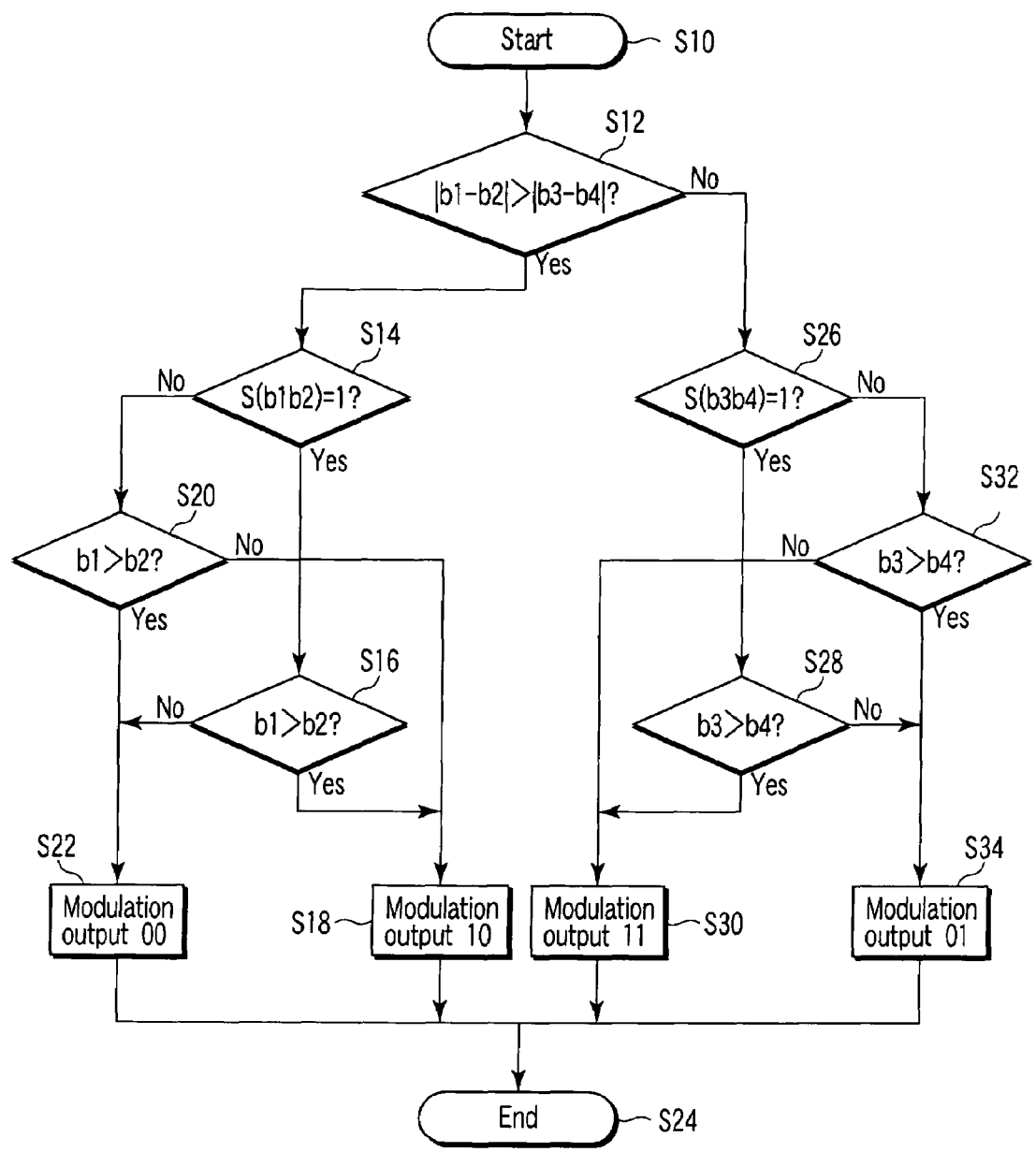
FIG. 9 is a flowchart showing a procedure of a reproduction method of reproducing the recording segments based on the second-type modulation method B shown in FIG. 7B without demagnetization, according to an embodiment.

The flowchart shown in FIG. 9 shows a procedure of demodulating the information IA recorded in accordance with the first-type modulation scheme A, on the basis of the values of the reproduction signal intensities and the magnetization state determined from the information IB recorded in accordance with the second-type modulation scheme B. This procedure enables the information IA to be demodulated utilizing the difference between magnetization signals without destroying the information IB as a result of magnetization in the direction 2. The process is started in step S10. The absolute value |b1−b2| of the difference between the intensities b1 and b2 in a reproduction signal S is compared with absolute value |b3−b4| of the difference between the intensities b3 and b4 in another reproduction signal S. The absolute value of the difference is hereinafter simply referred to as the difference (S12). In each pattern of 4 second-type segments shown in FIG. 8B, the signal intensities (b1, b2) from the 2 segments representing 1 second-type bit are compared with the signal intensities (b3, b4) from the 2 segments representing another 1 second-type bit. If |b1−b2|>|b3−b4|, that is, if in the 4 segment pattern, the difference (|b1−b2|) between the signal intensities from the former 2 segments is larger than that (|b3−b4|) between the signal intensities from the latter 2 segments, then the first-type segment sequence is (0, 1, 1, 1) or (1, 0, 1, 1) as seen in FIGS. 7A, 7B, and 8C.

Then, the process determines whether or not the former 2 segments are magnetized in the direction 1 so as to indicate the second-type data bit "1" (S(b1, b2)=1) (S14). If the former 2 segments are magnetized in the direction 1so as to indicate the second-type data bit "1" (S(b1, b2)=1), the segments are [1, 0] or [0, 1]. In step S16, the signal intensities b1 and b2 from the former 2 segments are compared with each other. If the signal intensity b1 is higher than that b2, the first-type data "10" is output which has been demodulated as seen in FIGS. 7A and 8A (S18). This is because the 2 segments are composed of the segment 1 and segment 0 [1, 0].

In step 16, if the signal intensity b1 is not higher than that b2, the first-type data "00" is output which has been demodulated as seen in FIGS. 7A and 8A (S18). This is because the 2 segments are composed of the segments [1, 0]. This output finishes the series of operations (S20).

In step S14, if the former 2 segments are magnetized so as not to indicate the second-type data bit "1" (S(b1, b2)≠1), the segments are [0, 0]. In step S16, the signal intensities b1 and b2 from the former 2 segments are compared with each other. If the signal intensity b1 is higher than that b2 (one of the segments is nonmagnetic and offers a reproduction intensity of the intermediate value), the first-type data "10" is output which has been demodulated as seen in FIGS. 7A and 8A (S18). This output finishes the series of operations (S20).

In step 16, if the signal intensity b1 is not higher than that b2, the first-type data "00" is output which has been demodulated as seen in FIGS. 7A and 8A (S18). This is because the 2 segments are composed of the nonmagnetic and magnetic segments (0, 1). This output finishes the series of operations (S20).

In step S12, if in the 4 segment pattern, the difference (|b1−b2|) between the signal intensities from the former 2 segments is not larger than that (|b3−b4|) between the signal intensities from the latter 2 segments, then the first-type segment sequence is (1, 1, 0, 1) or (1, 1, 1, 0) as seen in FIGS. 7A, 7B, and 8C.

Then, the process determines whether or not the latter 2 segments are magnetized so as to indicate the second-type data bit "1" (S(b3, b4)=1) (S26). If the latter 2 segments are magnetized so as to indicate the second-type data bit "1" (S(b3, b4)=1), the segments are [1, 0] or [0, 1]. In step S28, the signal intensities b3 and b4 from the latter 2 segments are compared with each other. If the signal intensity b3 is higher than that b4, the first-type data "11" is output which has been demodulated as seen in FIGS. 7A and 8A (S30). This is because the 2 segments are composed of the segment 1 and segment 0 [1, 0]. This output finishes the series of operations (S24).

In step 16, if the signal intensity b3 is not higher than that b4, the 2 segments are formed of [0, 1]. Consequently, the first-type data "01" is output which has been demodulated as seen in FIGS. 7A and 8A (S18). This output finishes the series of operations (S20).

In step S26, if the latter 2 segments are magnetized so as not to indicate the second-type data bit "1" (S(b3, b4)≠1), the segments are [0, 0]. In step S32, the signal intensities b3 and b4 from the former 2 segments are compared with each other. If the signal intensity b3 is higher than that b4 (one of the segments is nonmagnetic and offers a reproduction intensity of the intermediate value), the first-type data "11" is output which has been demodulated as seen in FIGS. 7A and 8A (S18). This is because the 2 segments are composed of the magnetic and nonmagnetic segments (1, 0). This output finishes the series of operations (S20).

In step 32, if the signal intensity b3 is not higher than that b4, the first-type data "01" is output which has been demodulated as seen in FIGS. 7A and 8A (S18). This is because the 2 segments are composed of the nonmagnetic and magnetic segments (0, 1). This output finishes the series of operations (S20).

The process shown in FIG. 9 enables the preformed first-type data to be read even if the segment pattern is provided with a DC magnetic field to hinder the magnetic segments from being demagnetized.

As described above, the maximum inversion interval for the first-type modulation scheme A is specified to be 1. The minimum inversion interval for the second-type modulation scheme B is specified to be 2. A combination of the modulation schemes A and B enables the information IB to be recorded in the pattern area in which the information IA has been recorded as a pattern and then enables the additionally recorded information IB to be acquired using the modulation scheme B. In other words, the information IA that cannot be erased by the first-type modulation scheme A is recorded in the ROM area of the magnetic recording medium as a pattern. Further, the magnetic segments can be used to additionally record the information IB that can be erased by the second-type modulation scheme B.

As described above, the first-type information IA recorded using a pattern of the segment 1 and segment 0 cannot have its pattern changed by the write head. This enables recording of, for example, ID information on the magnetic recording medium and information on security. Further, the first-type information IA can be recorded on the magnetic recording medium during its production, as a magnetic pattern. This enables medium in which information has been recorded to be produced in a shorter time than recording with the write head after completion of the magnetic recording apparatus. Consequently, it is possible to inexpensively provide a magnetic recording apparatus in which the first-type information has been recorded.

On the other hand, the pattern area in which the first-type information IA is recorded is composed of a pattern of the magnetic and nonmagnetic segments. Thus, the write head can be used to rewrite, in the magnetic recording apparatus, the magnetization information on the recording portion. Specifically, the write head is used to rewrite the first-type information IA in the pattern area into the magnetic segments in the pattern area; the first-type information IA can be reproduced as a given magnetization pattern using the write head or demagnetizing device. This enables the second-type information IB, which is different from the first-type information IA, to be recorded in and reproduced from the magnetic recording medium. An additional recording capacity can thus be added to the pattern area to increase the additional recording capacity of the magnetic recording medium.

The first-type information IA recorded in the pattern area as a magnetic pattern is recorded in a converted form using a certain first-type modulation scheme A. Moreover, after production of the magnetic recording apparatus, the second-type modulation scheme B different from the first-type modulation scheme A is used to write the second-type information IB into the pattern area by means of the write head. This enables the additionally recorded information IB to be correctly recorded and reproduced.

Here, the modulation scheme means conversion of original data into a certain data string. Various modulation schemes are available. For example, a 1-7 run length limited (RLL) modulation scheme can be used to limit the maximum magnetization inversion interval to 7. For example, if the original data is composed of a run of zeros, a recording inversion "0→1" or "1→0" is encountered every 7 recording units. In a magnetic pattern, the boundary between a recording portion and a segment 0 is surely present within 7 recording units.

Accordingly, if the information IA has been recorded by the 1-7 RLL modulation scheme, the recording units constituting the second-type information IB can be prevented from being lost under the effect of the nonmagnetic segments present in the magnetic pattern of the first-type information IA, by using a modulation scheme of recording at least one recording unit at a period at least seven times as long as that for the information IA.

Provided that the maximum magnetization inversion interval for the first-type modulation scheme A is equal to or smaller than the minimum magnetization inversion interval for the second-type modulation scheme B, the magnetic/nonmagnetic segment inversion section based on the first-type modulation scheme A is present in all the magnetization inversion sections based on the second-type modulation scheme B. This enables the information IB recorded by the second-type modulation scheme B to be reproduced without any information loss regardless of the contents of the first-type information IA.

Further, provided that the maximum interval between the nonmagnetic segments in a magnetic and nonmagnetic segment pattern produced by the first-type modulation scheme A is smaller than the minimum magnetization inversion interval based on the second-type modulation scheme B, the second-type information IB can be similarly additionally recorded in and reproduced from the pattern area.

Method for Producing Media

With reference to FIGS. 10A to 10G and 11A to 11G, description will be given of a method for manufacturing recording medium according to an embodiment of the present invention. A recording medium is desirably produced using one of the two processes described below. However, clearly, the present invention is not limited to this. Specifically, the ROM area of the recording medium will be described below. The RAM area will not be described in detail because its magnetic layer is formed on a substrate during manufacture of the ROM area.

First Production Method (Magnetic Member Processing Type)

Figure 10A:
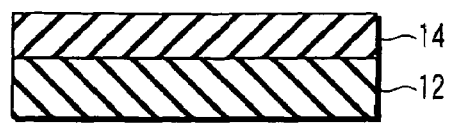
FIGS. 10A to 10G are sectional views schematically showing the steps of a method of manufacturing a recording medium according to an embodiment.
Figure 10B:
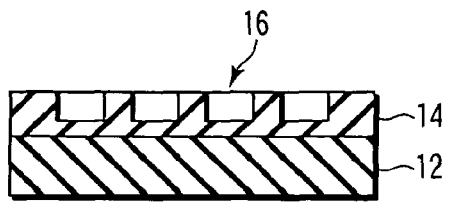

First, an imprint stamper is produced. Specifically, as shown in FIG. 10A, a resist 14 is coated on a substrate 12. The substrate 12 is preferably made of Si or glass. The resist 14 is one commonly used for electron beam drawing. As shown in FIG. 10B, a magnetic member pattern 16 is drawn using an electron beam. A developing process is executed to form a pattern, that is, recesses and protrusions of the resist, on the substrate 1. During the electron beam drawing, information IA is modulated by the first-type modulation scheme A to obtain first-type recording bits, which are then formed into a pattern area.

Figure 10C:
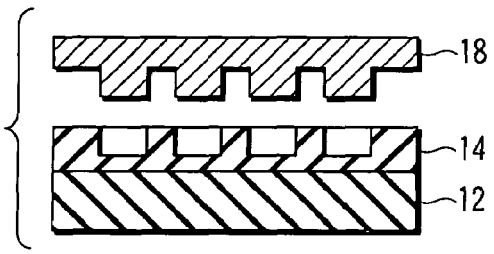

Then, as shown in FIG. 10C, a stamper 18 is formed, by electroforming, on the resist layer 14 on which the pattern area has been formed as shown in FIG. 10B. The preferred material for the stamper is Ni, but the present invention is not limited to this. The recesses and protrusions of the resist 14 are inversely transferred to the surface of the stamper 18. Alternatively, although not shown, the stamper may be obtained by etching the resist layer 14 shown in FIG. 10B to transfer the recesses and protrusions of the resist layer 14 to the substrate 12 as the protrusions and recesses.

The imprint stamper 18 is obtained by the process described below.

Figure 10D:
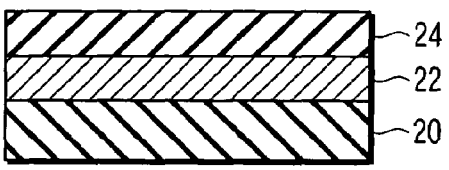

As shown in FIG. 10D, a magnetic layer 22 for magnetic recording is deposited on a medium substrate 20. The magnetic layer 22 is preferably made of a material suitable for vertical recording and comprises a ferromagnetic film for recording. An underlayer consisting of a soft magnetic material is preferably provided under the ferromagnetic film for recording. An imprinting resist layer 24 is further coated on the magnetic layer 22 obtained.

Figure 10E:
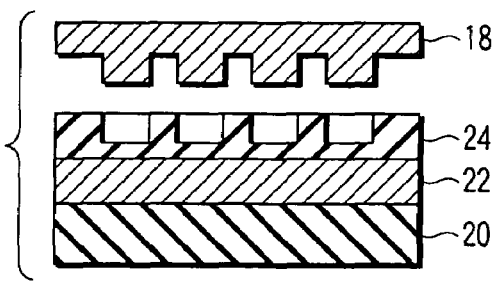

Then, as shown in FIG. 10E, the imprint stamper 18 is placed above and opposite the resist layer 24 obtained in FIG. 10D. On the basis of the imprint method, pressure is applied to the imprint stamper 18 and the resist layer 24 to press them against each other. This allows the recess and protrusion pattern on the surface of the imprint stamper 18 to be transferred to the surface of the resist layer 24. The imprint stamper 18 is subsequently stripped off.

Figure 10F:
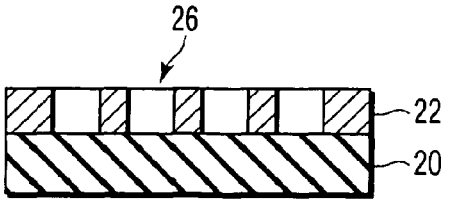

As shown in FIG. 10F, the resist layer 24 with the recess and protrusion pattern is etched to process the underlying magnetic layer 22. The magnetic layer 22 is patterned in accordance with the recess and protrusion pattern on the surface of the resist layer 24 to form a pattern area 26 corresponding to the first-type recording bits. That is, the pattern area 26 on the magnetic layer is formed of the remaining magnetic segments and the nonmagnetic segments from which the magnetic layer has been removed.

Figure 10G:
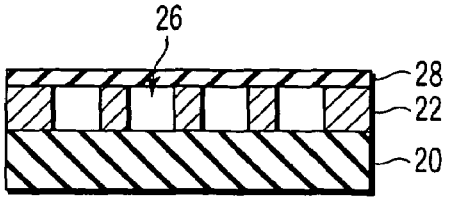

As shown in FIG. 10G, a carbon protective film 28 is provided on the magnetic layer 22 with the magnetic member pattern area 26. A lubricant is further applied to the carbon protective film 28.

The above method produces recording medium in which the information IA in the pattern area 26 constitutes a recording pattern of the magnetic and non-magnetic segments. This recording medium is installed in a recording apparatus in a manner similar to the conventional one.

Second Production Method (Substrate Processing Type)

Figure 11A:
FIGS. 11A to 11G are sectional views schematically showing the steps of a method of manufacturing a recording medium according to another embodiment of the present invention.
Figure 11B:
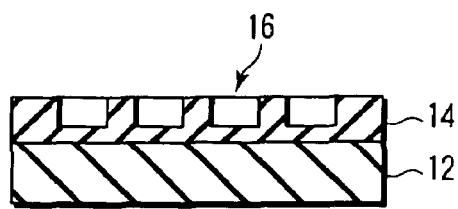
Figure 11C:
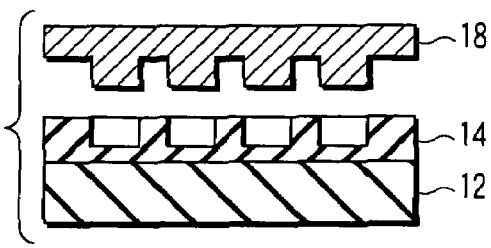

A second production method (substrate processing type) shown in FIGS. 11A to 11G may be employed instead of the first production method (magnetic member processing type) shown in FIGS. 10A to 10G. The steps executed before production of an imprint stamper are similar to those of the first method shown in FIGS. 10A to 10C. Thus, the description otherwise given with reference to FIGS. 11A to 11C is omitted.

An imprint stamper 18 is produced through the process shown in FIGS. 11A to 11C. Then, as shown in FIG. 11D, an imprinting resist layer 30 is coated on the medium substrate 20.

Figure 11D:
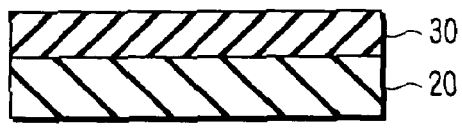
Figure 11E:
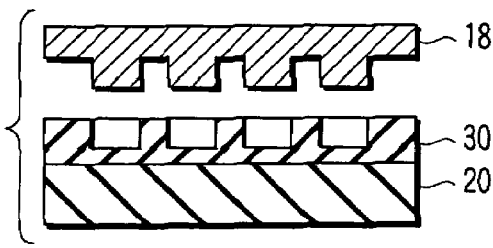

Then, as shown in FIG. 10E, the imprint stamper 18 is placed above and opposite the resist layer 30 obtained in FIG. 11D. On the basis of the imprint method, pressure is applied to the imprint stamper 18 and the resist layer 30 to press them against each other. This allows the recess and protrusion pattern on the surface of the imprint stamper 18 to be transferred to the surface of the resist layer 30. The imprint stamper 18 is subsequently stripped off from the resist layer 30.

Figure 11F:
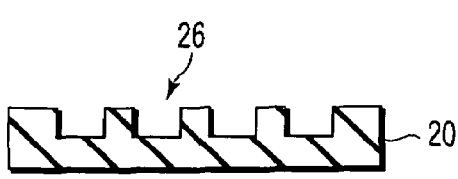

Then, as shown in FIG. 11F, the resist layer 30 with the recess and protrusion pattern is etched. Thus, as the etching of the resist layer 30 progresses, the surface of the substrate 20 is processed in accordance with the recess and protrusion pattern of the resist layer 30. The surface of the substrate 20 from which the resist layer 30 has been removed is patterned in accordance with the recess and protrusion pattern on the surface of the resist layer. This forms a pattern area 26 corresponding to the first-type recording bits.

Figure 11G:
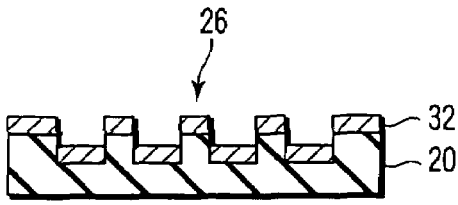

As shown in FIG. 11G, a magnetic recording magnetic layer 32 is deposited on the recess and protrusion substrate 20 obtained. Specifically, the magnetic layer 32 is formed all over the pattern area 26; as shown in FIG. 11G, the magnetic layer 32 is formed not only on the protrusions but also in the recesses. The magnetic layer 32 is preferably made of a material suitable for vertical recording and comprises a ferromagnetic film for recording. An underlayer consisting of a soft magnetic material is preferably provided under the ferromagnetic film for recording. A carbon protective film is provided on the substrate 20 with the recess and protrusion area 26 in which the magnetic layer 32 have been formed. A lubricant is further applied to the carbon protective film.

The above method produces a recording medium in which the information IA in the pattern area constitutes the recess and protrusion pattern 26 of the magnetic member. This recording medium is installed in a recording apparatus in a manner similar to the conventional one. The recording apparatus can rewritably record the second-type information IB on the recording medium.

Configuration of the Drive

Now, with reference to FIG. 12, description will be given of a drive section of a magnetic disk apparatus (recording and reproducing apparatus) that can write the second-type information on the recording medium of the present invention.

Figure 12:
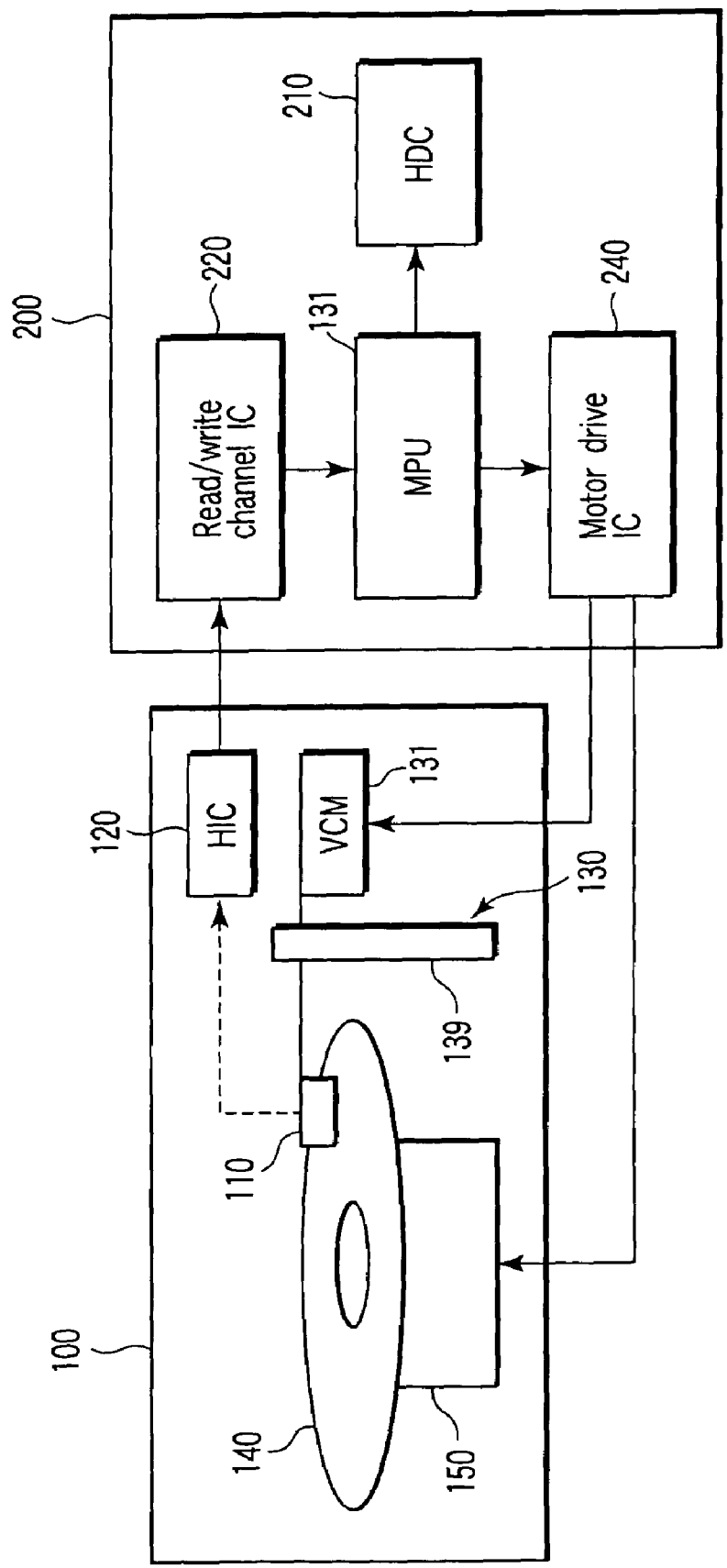
FIG. 12 is a block diagram schematically showing a recording and reproducing apparatus according to an embodiment of the present invention.

FIG. 12 is a conceptual drawing showing the basic structure of the drive section of the magnetic disk apparatus (recording and reproducing apparatus). FIG. 12 shows only one recording medium (magnetic disk) for the convenience of description. However, as is well known, the apparatus may obviously comprise and be adapted for a plurality of magnetic disks.

The magnetic disk apparatus shown in FIG. 12 comprises one recording medium (magnetic disk) 140 including the above pattern area. A normal RAM area and the already described ROM area are formed in predetermined areas of the recording medium 140; users can freely record data in the RAM area.

As is often the case, two magnetic heads 110 (lower and upper heads) are arranged on the respective sides of the magnetic disk 140. The magnetic head 110 is rotated and moved in a radial direction of the magnetic disk 140 being rotated. Consequently, the opposite sides of the magnetic disk 140 are scanned by the magnetic head 110, which thus records or reproduces information on or from the magnetic disk 140.

As shown in FIG. 12, the disk apparatus is composed of a disk drive section 100 in which the magnetic disk 140 is formed and which is also called a head disk assembly (HDA) and a printed circuit board 200 also called a PCB.

Head Disk Assembly (HDA)

The disk drive section 100 (HDA) comprises a spindle motor (SPM) 150 that rotates the recording medium 140. The head 110 is moved over the recording medium 140 by a head moving mechanism 130.

The head 110 has magnetic head elements mounted on a slider (ABS) that is a head main body; the magnetic head elements include a read element (GMR element) and a write element. The head 110 is mounted on a head moving mechanism 130 having a suspension arm 120 that supports a head, a pivot shaft 139 that rotatably supports the arm 120, and voice coil motor (VCM) 131. The VCM 131 allows the arm 120 to generate a rotating torque around the pivot shaft 139 in the radial direction of the disk 140. I/O signals from the head 110 are amplified by a head amplifier (HIC) 160 fixed to the arm. The signals are electrically transmitted to a printed circuit board (PCB) 200 via a flexible cable (FPC).

In the description of the present embodiment, the HIC is installed on the head moving mechanism in order to reduce the signal-to-noise (SN) ratio of head signals. However, obviously, HIC may be fixed to the main body portion.

Data can be recorded on and reproduced from both surfaces (front and back surfaces) of the recording medium 140. Patterns are formed on the front and back surfaces so that the moving trajectory of head of the drive substantially matches the circular shape of a servo area pattern. The recording medium 140 is incorporated into the disk drive section 100. The specifications of the disk naturally include an outer and inner diameters and recording and reproducing characteristics which are adapted for the disk drive section 100 as is the case with the prior art. However, the circular shape of the servo area is such that the circular center is located on a circumference having a radial position at the distance from the rotating center of the disk to a pivot center and such that the circular radius corresponds to the distance from the pivot to the magnetic head element.

(PCB)

Four system LSIs are mainly mounted on printed circuit board (PCB) 200. Specifically, the PCB 200 comprises a disk controller (HDC) 210, read-write channel IC 220, MPU 230, and a motor driver IC 240.

The MPU 230 is a control section for a drive control system and includes a ROM, RAM, CPU, and logic processing section, which cooperatively provide a head positioning control system. The logic processing section is a mathematic processing section composed of a hardware circuit and is used for high-speed mathematic processes. Appropriate operating firmware (FW) is saved to ROM. MPU controls the disk drive section 100 in accordance with firmware.

The HDC 210 is an interface section in the hard disk. The HDC 210 manages the entire drive by exchanging information with an interface between the disk drive section 100 and a host system (for example, a personal computer) or with the MPU 230, read-write channel IC 220, and motor driver IC 240.

The read/write channel IC 240 is a head signal processing section for read and write operations. The read/write channel IC 240 is composed of a circuit which switches a channel for the head amplifier (HIC) 160 and which processes recording and reproduction signals such as read and write signals.

The read/write channel IC 240 restores the modulation scheme A for reading the information IA recorded in the pattern area, additionally records the information IB in the pattern area using the modulation scheme B, and restores the additionally recorded information IB on the basis of the modulation scheme B.

The motor driver IC 240 is a driver section that allows the VCM 131 and spindle motor 150 to be driven. The motor driver IC 240 drivingly controls the spindle motor 150 to a given rotation speed and drives the head moving mechanism 130 by providing the VCM 131 with a manipulated variable for the VCM 131 which is a current value provided by the MPU 230.

The recording and reproducing apparatus shown in FIG. 12 can additionally record the second-type modulation information in the pattern area of the magnetic recording medium on which the first-type modulation information has been recorded in the pattern area as a magnetic material pattern. This makes it possible to minimize a decrease in the capacity of additionally recordable capacity associated with the magnetic material pattern.

When the recording portion of the pattern area is composed of a pattern of the magnetic material, while the non-magnetized segments are composed of a pattern of the nonmagnetic material, the volume of the magnetic material is zero in the pattern area of the nonmagnetic material. If for example, the demagnetizing device is used to demagnetize the entire pattern area, a magnetization signal received by the read head varies between the magnetic material portion and the non-magnetic material portion. The volume of the magnetic material in the non-magnetized segments need not necessarily be zero. The signal for the read head is varied provided that the volume of the magnetic material in the non-magnetized segments is smaller than that in the recording portion. Therefore, this magnetic pattern is appropriate.

The magnetic material volume can be formed into a pattern by, for example, etching the magnetic material during production of a medium.

The present invention also provides a magnetic recording and reproducing apparatus characterized in that information is recorded in the pattern area on the magnetic recording medium in the magnetic recording apparatus on the basis of a difference in the height, on the medium surface, of top of the magnetic material in which magnetization is recorded by the write head.

Specifically, if the magnetic material in the recording portion of the pattern area is higher than that in the non-magnetized segments, then during a write operation, the write can execute recording only on the magnetic material in the recording material.

According to the recording method and apparatus of the present invention, the recording apparatus comprises the recording medium on which the first-type modulation information is recorded by forming a magnetic material pattern in the pattern area. The recording apparatus can additionally record the second-type modulation information in the pattern area. This makes it possible to minimize a decrease in additionally recordable capacity associated with the magnetic material pattern.

As described above, the present invention provides the method by which even a magnetic recording apparatus comprising magnetic recording medium having a pattern area corresponding to a ROM area to additionally record information in the pattern area using a write head. The present invention also provides a recording apparatus capable of the additional recording.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording apparatus comprising: a magnetic recording medium including a ROM area, and a RAM area on which rewritable information is magnetically recorded, the ROM area having a pattern of a first-type segment sequence indicating first-type modulation information which is fixedly recorded on the ROM area based on a first type-modulation scheme, the first-type segment sequence being formed as a sequence of magnetic and nonmagnetic segments, and a recording unit configured to record second-type modulation information on the ROM area based on a second-type modulation scheme, the recording unit selectively magnetizing the magnetic segments in the pattern to record a second-type segment sequence of first and second segments magnetized in one and opposite directions, which indicates the second-type modulation information, wherein a maximum inversion interval between the first-type magnetic and nonmagnetic segments is equal to or less than a minimum magnetization inversion interval based on the second-type modulation scheme.

2. The apparatus according to claim 1, further comprising:
a first demodulating unit configured to demodulate the first-type modulation information into first-type recording information; and
a second demodulating unit configured to demodulate the second-type modulation information into second-type recording information.

3. The apparatus according to claim 1, wherein the magnetic recording medium comprises a substrate and a magnetic layer formed on the substrate, recesses and protrusions being formed on the substrate and a formation corresponding to the recesses and protrusions being formed on the magnetic layer, which corresponds to the first-type segment sequence of the magnetic and nonmagnetic segments.

4. The apparatus according to claim 1, wherein the magnetic recording medium comprises a substrate, and an arrangement of magnetic and non-magnetic layer portions formed on the substrate, the arrangement of the magnetic and non-magnetic layer portions corresponding to the first-type segment sequence of the magnetic and nonmagnetic segments.

5. The apparatus according to claim 4, wherein the non-magnetic layer portions are formed by selectively removing parts of a magnetic layer formed on the substrate, and the magnetic layer portions are formed by un-removing the remaining parts of a magnetic layer formed on the substrate.

6. The medium according to claim 1, wherein the non-magnetic layer portions are formed by selectively removing parts of a magnetic layer formed on the substrate, and the magnetic layer portions are formed by un-removing the remaining parts of a magnetic layer formed on the substrate.

7. The medium according to claim 1, wherein a maximum interval between the first-type non-magnetized segments in the pattern area is equal to or smaller than a minimum magnetization inversion interval for the second-type magnetized segments.

8. A magnetic recording medium comprising:
a RAM area on which rewritable information is magnetically recorded; and
a ROM area having a pattern of a first-type segment sequence indicating first-type modulation information which is fixedly recorded on the ROM area based on a first-type modulation scheme, the first-type segment sequence being formed as a sequence of magnetic and nonmagnetic segments, the magnetic segments in the pattern being selectively magnetized to record a second-type segment sequence of first and second segments magnetized in one and opposite directions on the ROM area based on a second-type modulation scheme, which indicates second-type modulation information, wherein a maximum inversion interval between the first-type magnetic and nonmagnetic segments is equal to or less than a minimum magnetization inversion interval based on the second-type modulation scheme.

9. The medium according to claim 8, wherein the magnetic recording medium comprises a substrate and a magnetic layer formed on the substrate, recesses and protrusions being formed on the substrate and a formation corresponding to the recesses and protrusions being formed on the magnetic layer, which corresponds to the first-type segment sequence of the magnetic and nonmagnetic segments.

10. The medium according to claim 8, wherein the magnetic recording medium comprises a substrate, and an arrangement of magnetic and non-magnetic layer portions formed on the substrate, the arrangement of the magnetic and non-magnetic layer portions corresponding to the first-type segment sequence of the magnetic and nonmagnetic segments.

11. A method of magnetically recording first-type and second-type modulation information and rewritable information on a magnetic recording medium, the magnetic recording medium including a ROM area and a RAM area on which the rewritable information is magnetically recorded, the ROM area having a pattern of a first-type segment sequence indicating the first-type modulation information which is fixedly recorded on the ROM area based on a first-type modulation scheme, the first-type segment sequence being formed as a sequence of magnetic and nonmagnetic segments, said method comprising: recording the second-type modulation information on the ROM area based on a second-type modulation scheme, which includes selectively magnetizing the magnetic segments in the pattern to record a second-type segment sequence of first and second segments magnetized in one and opposite directions, which indicates the second-type modulation information, wherein a maximum inversion interval between the first-type magnetic and non-magnetic segments is equal to or less than a minimum magnetization inversion interval based on the second-type modulation scheme.

12. The method according to claim 11, further comprising providing first-type recording information which is modulated in accordance with the first-type modulation scheme to convert the first-type modulation information.

13. The method according to claim 11, further comprising providing second-type recording information which is modulated in accordance with the second-type modulation scheme to convert the second-type modulation information.

14. The method according to claim 11, further comprising:
demodulating the first-type modulation information into the first-type recording information, and
demodulating the second-type modulation information into the second-type recording information.

15. The method according to claim 11, wherein the magnetic recording medium comprises a substrate and a magnetic layer formed on the substrate, recesses and protrusions being formed on the substrate and a formation corresponding to the recesses and protrusions being formed on the magnetic layer, which corresponds to the first-type segment sequence of the magnetic and nonmagnetic segments.

16. The method according to claim 11, wherein the magnetic recording medium comprises a substrate, and an arrangement of magnetic and non-magnetic layer portions formed on the substrate, the arrangement of the magnetic and non-magnetic layer portions corresponding to the first-type segment sequence of the magnetic and nonmagnetic segments.

17. The method according to claim 16, wherein the non-magnetic layer portions are formed by selectively removing parts of a magnetic layer formed on the substrate, and the magnetic layer portions are formed by un-removing the remaining parts of a magnetic layer formed on the substrate.

18. A magnetic recording medium comprising:
a RAM area; and
a ROM area,
wherein the ROM area stores both fixed data as a pattern of magnetic and non-magnetic portions based on a first modulation scheme and rewriteable data as a pattern in which the magnetic portions have one or the other of different magnetization directions based on a second modulation scheme, and
wherein a maximum inversion interval for magnetic and non-magnetic portions in the first modulation scheme is equal to or less than a minimum magnetization inversion interval for the magnetic portions in the second modulation scheme.

19. An apparatus comprising:

a read unit configured to selectively read the fixed data and the rewriteable data from the ROM area of the magnetic recording medium according to claim 18.

20. A magnetic recording apparatus comprising:

a write unit configured to write rewriteable data to a ROM area of a magnetic recording medium already storing fixed data as a pattern of magnetic and non-magnetic portions based on a first modulation scheme, the write unit being configured to write the rewriteable data by selectively changing the magnetization direction of the magnetic portions based on a second modulation scheme, wherein the write unit is further configured to write the rewriteable data so that a maximum inversion interval for magnetic and non-magnetic portions in the first modulation scheme is equal to or less than a minimum magnetization inversion interval for the magnetic portions in the second modulation scheme.

* * * * *